J. L. GARVER.
RESILIENT WHEELED VEHICLE.
APPLICATION FILED DEC. 16, 1916. RENEWED DEC. 29, 1921.

1,437,800.

Patented Dec. 5, 1922.
3 SHEETS—SHEET 2.

INVENTOR
James L. Garver,
by Geyer & Popp
ATTORNEYS

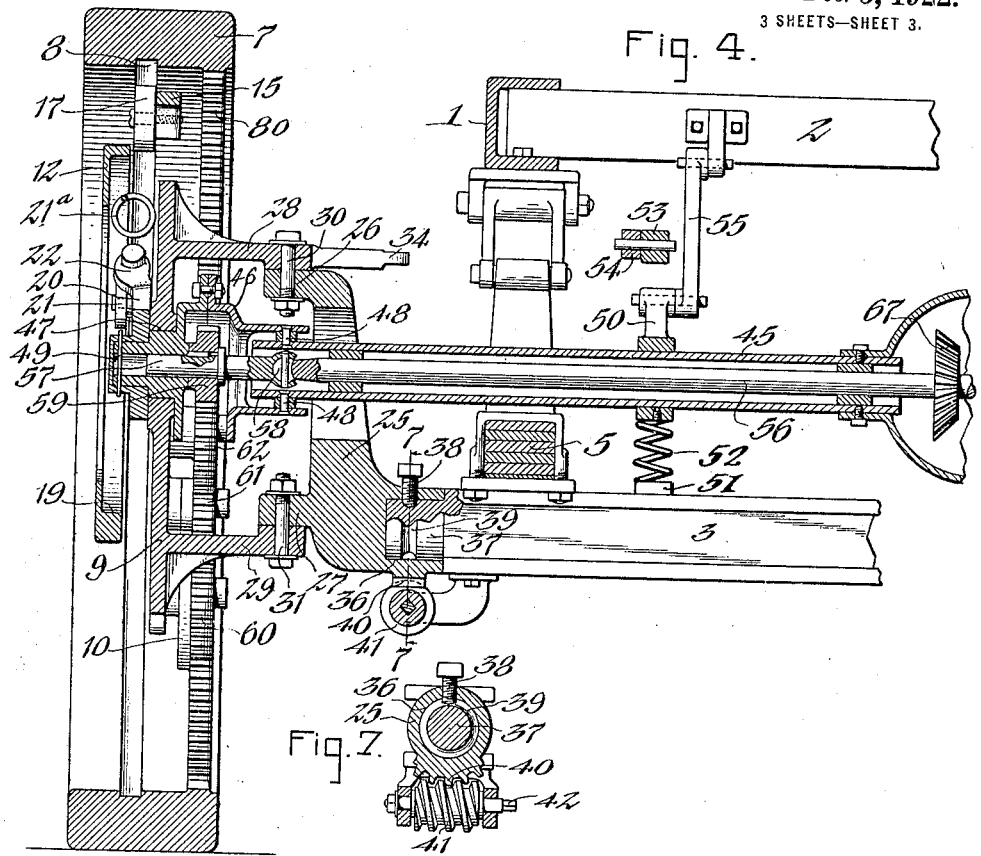
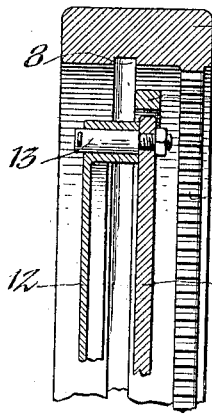
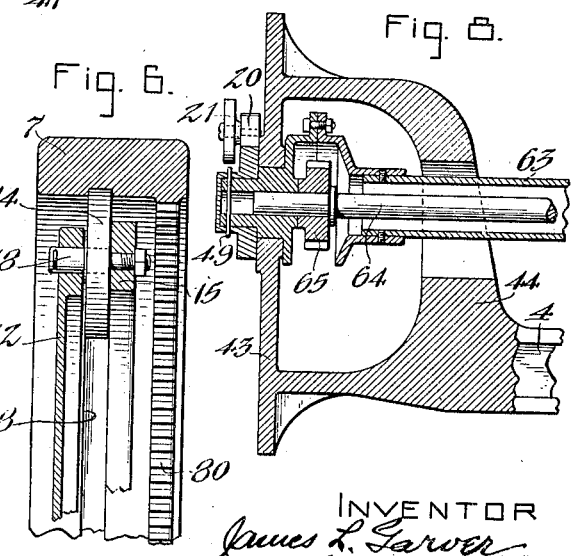

Patented Dec. 5, 1922.

1,437,800

UNITED STATES PATENT OFFICE.

JAMES L. GARVER, OF SPRINGFIELD, OHIO.

RESILIENT-WHEELED VEHICLE.

Application filed December 16, 1916, Serial No. 137,337. Renewed December 29, 1921. Serial No. 525,742.

*To all whom it may concern:*

Be it known that I, JAMES L. GARVER, a citizen of the United States, residing at Springfield, in the county of Clark and State of Ohio, have invented new and useful Improvements in Resilient-Wheeled Vehicles, of which the following is a specification.

This invention relates to a cushioning device or resilient mechanism for wheeled vehicles.

The objects of this invention are to provide improved means for rendering the wheels of the vehicle resilient or yieldable under the shocks or loads which may be imposed upon the same; also to provide a resilient mechanism which permits of utilizing the effect of spring elements arranged outside of the wheel proper and also the resilience of the springs which connect the main frame of the vehicle with the axle; also to so organize the spring system of the vehicle as a whole that the resilient elements in different parts of the same are flexed simultaneously; also to so design the resilient wheel that the same may be effectively employed as a driving wheel without disturbing the driving connection between the rim of the wheel and the motor mounted on the frame; also to provide a wheel of this character which can be employed as a steering wheel for the vehicle, also to provide means whereby the resilient effect on the wheels may be readily and easily adjusted to suit different requirements. To provide a larger range of movement of the peripheral parts of the wheel relative to the support on which the same is yieldingly mounted; to provide spring means on the main frame of the vehicle which may be used either alone or in conjunction with springs in the wheels and thus supplement the action of the latter and permit of obtaining adequate spring capacity and ample carrying room therefor.

Figure 1:
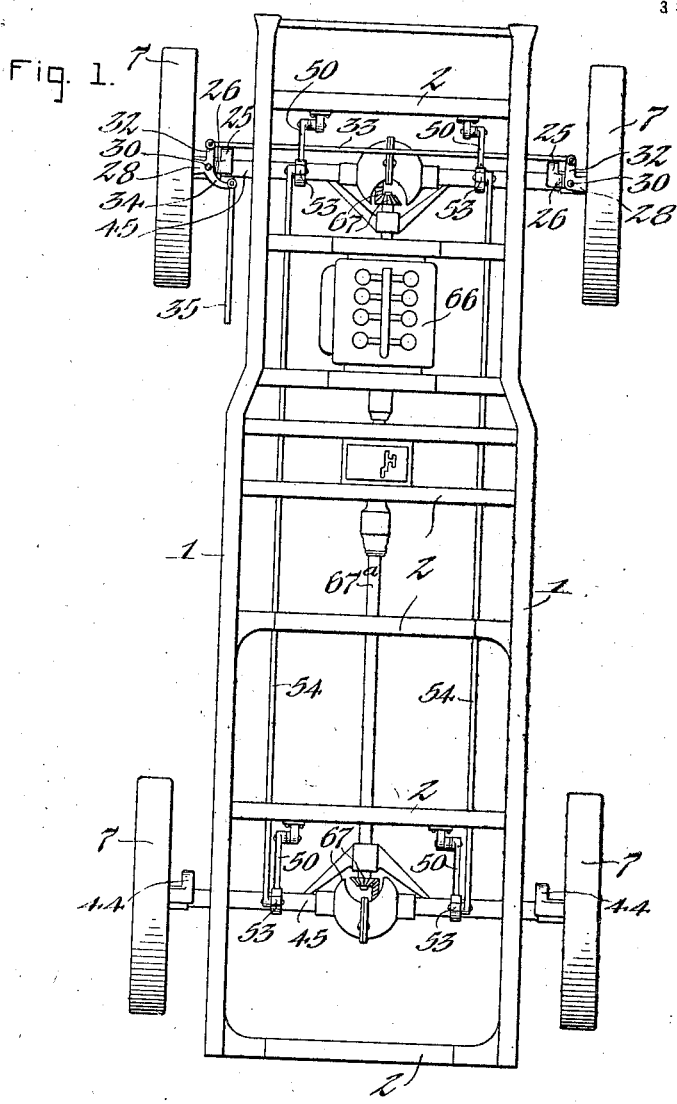
Figure 2:
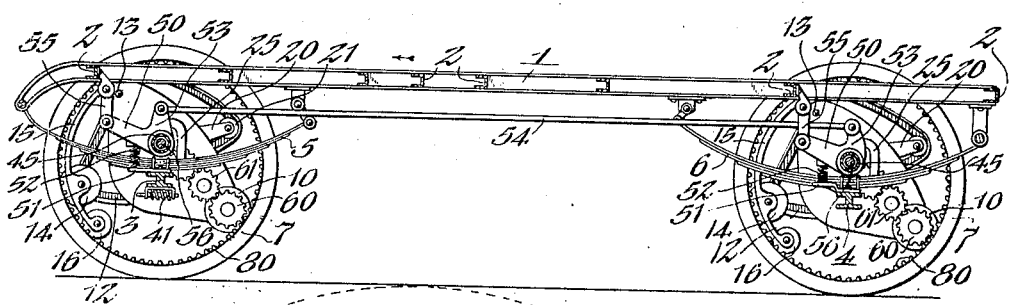
Figure 3:
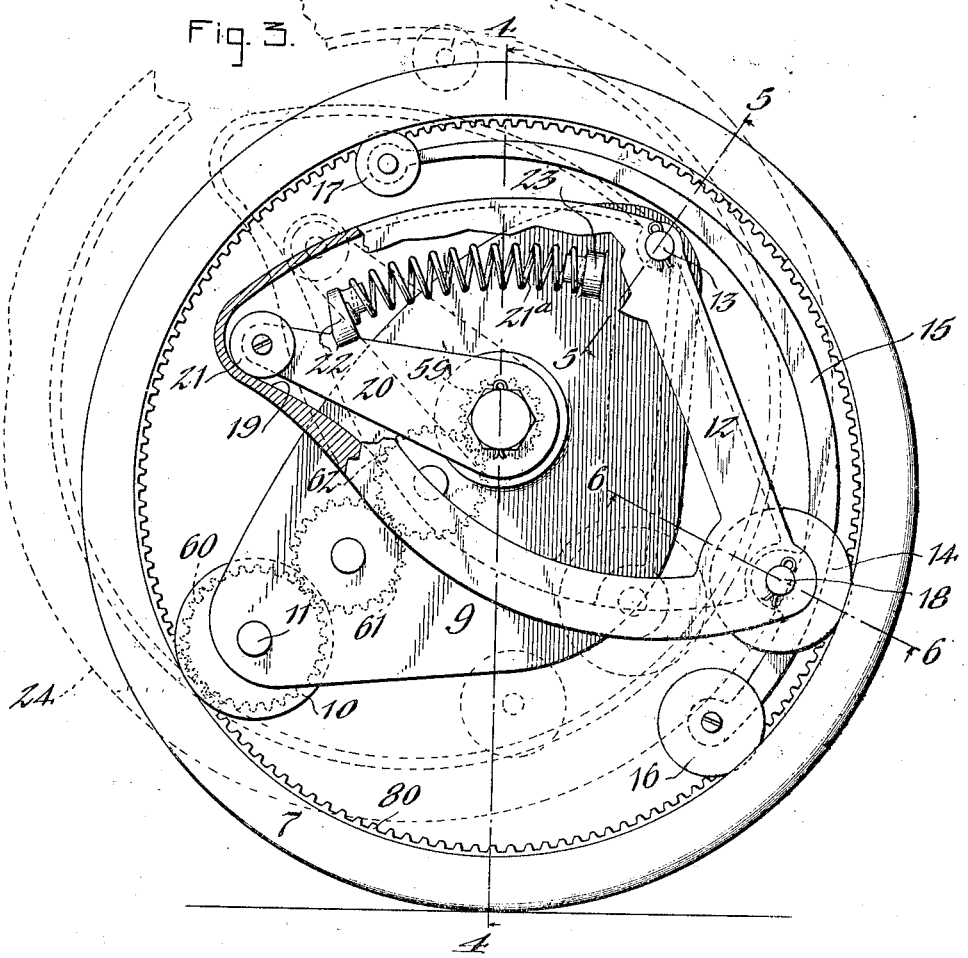

In the accompanying drawings: Figure 1 is a top plan view of a motor vehicle equipped with one embodiment of my invention. Figure 2 is a vertical longitudinal section of the same. Figure 3 is a side elevation of one of the wheels, on an enlarged scale, with parts shown in section. Figure 4 is a vertical cross section taken on the correspondingly numbered line in Fig. 3. Figures 5 and 6 are fragmentary sections taken on lines 5—5 and 6—6, Fig. 3, respectively. Figure 7 is a vertical section taken on the correspondingly numbered line in Fig. 4. Figure 8 is a fragmentary vertical section similar to Fig. 4 but showing a construction which is suitable for a non-steering wheel.

Similar characters of reference indicate corresponding parts throughout the several views.

The frame of the vehicle may be of any suitable construction that shown in the drawings comprising two longitudinal side bars 1, 1 and a plurality of cross bars 2 connecting the side bars. 3, 4 represent the front and rear axles of the vehicle which are arranged crosswise below the frame and connected with the latter by front and rear springs 5, 6. These springs may be of any suitable construction to form a resilient connection between the frame and axles, those shown in the drawings being semi-elliptical but it is to be understood that any other form of yielding elements may be employed for this purpose and that the form here shown is merely typical of one variety suitable for this purpose.

Inasmuch as the general construction of the four wheels of this vehicle is substantially alike and the same only differ in so far as their use as steering and non-steering wheels is concerned the following description of one of these wheels is intended to apply to all four of the wheels so far as this is pertinent.

7 represents a wheel ring or annular supporting member which in the present case is represented as an annular rim bearing directly against the ground for the purpose of supporting the load, it being understood, however, that this ring may simply serve as one of the elements of a wheel and that other parts may be applied to the periphery thereof for engagement with the ground instead of resting this ring directly on the ground, as shown in the drawings. This ring is preferably constructed of metal and provided in its bore with an annular groove 8 and an annular gear rack or rim 80 which groove and rack are arranged side by side and spaced apart the required distance for a purpose which will presently appear. 9 represents a supporting bracket or member arranged adjacent to the space within the bore of the wheel ring and preferably located within the plane of the same, as shown in Fig. 4, although this is not essential. On its lower part on one side of a vertical line drawn from the axis of the wheel and preferably in rear of this line the supporting bracket engages by a movable contact with the supporting ring, the friction of this engagement being preferably reduced by providing the respective part of the supporting bracket with an anti-friction roller 10 pivoted thereon by means of a pin 11 and engaging with the bore of the supporting ring on one side of the gear rack.

12 represents a rocking shifting member having preferably the form of a skeleton-shaped arm or frame and arranged adjacent to and preferably within the space embraced by the supporting ring of the wheel. This rocking member is preferably mounted to swing vertically on a pivot pin 13 connecting the upper front part of the same with the upper front part of the supporting bracket, this pivotal connection being preferably located above a horizontal line drawn through the axis of the wheel and in front of a vertical line drawn through the same, as represented in Fig. 3. At a point preferably below said horizontal line and in front of said vertical line this rocking shifting frame or member engages movably with the adjacent part of the supporting ring, this engagement being preferably effected by means of a roller 14 pivoted on the respective part of the shifting member and engaging with the groove 8 in the bore of the supporting ring for reducing the frictional contact between these parts and also assisting in retaining the same against displacement in the direction of the axis of the wheel. This rocking member is further guided on the supporting ring by means of a crescent-shaped guide bar or member 15 which is arranged within the supporting ring and provided at its opposite ends with guide rollers 16, 17 engaging with the groove 8 of the supporting ring while a part thereof intermediate of its ends is connected with the rocking shifting member or arm by means of the same pin 18 which pivotally connects the bearing roller 14 with this rocking member, as shown in Fig. 3. On a suitable part of the rocking shifting member for instance, its lower part the same is provided with a cam 19 which in this instance faces upwardly and operates to turn a rock arm 20 by engaging with a roller 21 on the free end of the same. This rock arm is pivotally mounted on the central part of the supporting bracket so as to turn in a vertical plane and in the present instance projects rearwardly from its axis so that its roller engages normally with the cam 19 at a point in rear of a vertical line drawn through the axis or center of the wheel. The turning movement of this rock arm under the action of this cam may be yieldingly resisted in a variety of ways, for instance, by means of a spring 21$^a$ arranged between a lug 22 on the upper side of this rock arm and a lug 23 on the adjacent upper part of the supporting bracket, as shown in Fig. 3.

The parts of the wheel are represented in Fig. 3 by full lines in the position which they occupy when the same is free or practically free from any load. In this position of the parts the bracket is in its highest position relatively to the ring, the roller of the bracket engages with the bore of the ring a considerable distance above the lowermost part of the ring and also at a considerable distance rearwardly from the vertical center of the wheel and the rock arm is in its lowest position relative to the bracket, in which position these parts are held yieldingly by means of the spring 21$^a$ or equivalent resilient means. Upon now subjecting the wheel to a load which either pushes the supporting ring upwardly relatively to the bracket or depresses the bracket relatively to the supporting ring, the first effect is to cause that part of the supporting ring which is engaged by the lower bearing roller of the bracket to be pressed downwardly nearer to the ground. In responding to this action the front part of the wheel ring swings upwardly and rearwardly about an axis formed by the point of contact between the roller 10 and the wheel ring which shifted position varies according to the load imposed upon the wheel but is represented for example by the dotted line 24 in Fig. 3. This change in the position of the wheel ring also shifts the rocking frame or member 12 in the same direction so that the latter swings rearwardly about the pivot pin 13. As the rocking frame moves rearwardly relatively to the bracket its cam 19 by engaging with the roller 21 causes the rock arm 20 to be moved upwardly and forwardly, thereby flexing the spring 21$^a$ which is interposed between this rock arm and the relatively fixed bracket. This spring therefore in this case operates as the resilient element which yieldingly resists the depression of the supporting bracket relatively to the supporting ring and the elevation of this ring relatively to the bracket accordingly as a load is imposed upon the bracket or on the wheel ring or on both. When this load is again relieved or removed the spring 21$^a$ again returns these parts to their normal position represented by full lines in Fig. 3.

By arranging the fulcrum of the wheel ring 7 or similar peripheral part of the wheel on the relatively stationary bracket such as the part 10 thereof in rear of the vertical center of the wheel, this ring upon striking an obstruction in the road will be turned upwardly and rearwardly relatively to said fulcrum during the cushioning action of the wheel, thereby producing a momentary pause or retarding effect in the forward movement of the wheel whereby the shock to the wheel ring is minimized.

When this wheel is intended as one of the steering wheels of the vehicle the supporting bracket 9 may be pivotally connected with its companion axle of the vehicle so as to permit this wheel to turn about an axis which is vertical or substantially so. With this end in view the supporting bracket may be connected with one end of the front axle 3 of the vehicle in the manner shown in Figs. 1 and 4, in which case the front axle is provided with an axle arm 25 having laterally projecting upper and lower lugs 26, 27 which are arranged above and below the center of the wheel to which inwardly projecting lugs 28, 29 on the supporting bracket are pivoted by means of vertical pivot bolts 30, 31 which are arranged vertically in line with each other. Any suitable means may be employed for turning the steering wheels of a pair simultaneously for directing the vehicle, for instance, the upper lugs 28 of the brackets of the steering wheel may be provided with forwardly projecting steering arms 32 and these arms may be connected by a transverse rod 33 which causes the steering wheels to turn in unison about their vertical pivots and one of the upper bracket lugs 28 may be provided with a main steering arm 34 which is connected by a rod 35 with a steering apparatus of any suitable kind such as are now in common use.

Inasmuch as the range of action of the wheel ring and supporting bracket relatively to each other is dependent upon the distance which the point of engagement between the bracket and the wheel ring is arranged on one side of a vertical line drawn through the axis of the wheel, this point of engagement must be selected in accordance with the load likely to be carried by the vehicle. For instance by arranging the point of engagement between the bracket and the wheel ring a considerable distance in rear of said vertical line then the range of movement between the supporting bracket and wheel ring is increased and the leverage of the wheel ring is more pronounced so that a softer and milder action of the resilient devices is obtained, while upon shifting the point of engagement between the supporting bracket and the wheel ring forwardly relatively to said vertical line then the range of action between the bracket and ring is reduced as well as the leverage of the ring, thereby stiffening the resilient action of the wheel as a whole accordingly and rendering the same more suitable for heavy loads.

In order to permit of thus changing the point of engagement between the supporting bracket and the wheel ring to suit different requirements means are provided which permit of readily turning the bracket and the parts associated therewith relative to the wheel ring. In its preferred form this adjusting device consists in mounting the axle arm 25 on the body of the axle 3 in such manner that this axle arm is capable of being turned in a vertical plane relative to the body of the axle and held in any position to which the same may be adjusted. As shown in Figs. 2, 4 and 7 this may be accomplished by providing the inner side of this axle arm with a tubular socket 36 which forms a bearing whereby the same may turn on a pivot pin 37 arranged at the outer end of the axle body, the parts being free to turn relatively to each other but held against lengthwise displacement by means of a coupling screw 38 arranged on the axle arm and projecting into an annular groove 39 formed in the periphery of the axle pin 37. This axle arm may be turned vertically relatively to the axle body by means of a gear segment 40 formed on the exterior of the axle arm and a worm 41 journaled in suitable bearings on the axle body and engaging with said gear segment. Upon turning the worm by means of a wrench or the like applied to a square end 42 on its shaft, the axle arm together with the parts mounted thereon would be turned in a vertical plane and when the desired position has been reached the worm will hold the same in place without requiring a special fastening. By this means the supporting bracket may be quickly and readily turned so as to cause its lower or bearing roller to engage with the bore of the wheel ring at the required distance from the vertical center of the wheel to suit different requirements.

In the case of wheels which are not to be turned about a vertical axis for steering purposes and no circumferential adjustment of the supporting bracket is desired, the supporting bracket may be rigidly connected with the companion axle, such a construction being shown, for instance, in Fig. 8 in which the supporting bracket 43, the rear axle 4 and the axle arm 44 connecting the rear axle and bracket 43 are formed integrally, although obviously the same may be formed in separate parts which may be rigidly connected in any approved manner.

In order to increase the resilient tension of the wheels and enable them to yieldingly support a greater load means are provided for utilizing the resilient effect of elements which are mounted on the vehicle outside of the wheels proper. An example of the means for this purpose is shown in Figs. 1, 2 and 4 and constructed as follows:

Above the front and rear axles are mounted tension shafts each of which comprises a tubular or hollow central section 45 and two outer tubular end sections 46, each end section being journaled or pivotally mounted at its outer end in a bearing 47 on the companion supporting bracket concentrically with the adjacent rock arm 20 while the inner part of each outer tubular shaft section is pivotally connected with the inner section by means of pivot pins 48 which are arranged vertically in line with the pivot pins 30, 31 connecting the axle with the supporting bracket, thereby enabling the outer sections of the tension shaft to turn relatively to the inner section without disturbing the driving connection between the same. Each outer tension shaft section is rigidly connected with the companion shifting rock arm 20 by means of a pin 49, as shown in Fig. 4, or other suitable means. The inner tension shaft section is provided with one or more tension arms 50 and between the underside of each of these arms and a suitable shelf or projection 51 on the adjacent part of the companion central axle section is arranged a spring 52, as shown in Fig. 2. As the rock arm 20 of a wheel is turned upwardly by the action of the companion cam during a relative cushioning movement of a supporting bracket and wheel ring then the tubular tension shaft is also turned and its tension arms are caused to compress or flex the springs 52, thereby adding the resilience of these springs to that of the springs 21ª interposed between the companion rock arms 20 and supporting brackets and increasing the resilient tension of the cushioning device accordingly.

If desired, the spring 21ª or its equivalent within the wheel proper may be omitted altogether and in its stead the resilience of the spring 52 between the axle and the arms 50 of the tension shaft or equivalent tension means outside of the wheel proper may be relied upon as the sole means for obtaining the resilient action of the vehicle.

By connecting the two rock arms 20, 20 of a pair of wheels on opposite sides of the vehicle by means of the tension shaft just referred to it results in causing any load or shock to be equalized among the different resilient elements associated with these wheels and the wheel rings to be shifted uniformly.

In order to still further distribute the load over the different spring elements in different parts of the vehicle and obtain uniform yielding of the wheels both at its front and rear end and also on opposite sides thereof regardless of whether the load or shock is applied to only one wheel or part of the vehicle, or over different parts of the same, means are provided which cause all the mechanism of the several wheels and the parts associated therewith to simultaneously flex all of the resilient elements associated therewith. This may be accomplished in various ways, for instance by providing the central sections of the hollow tension shafts with upwardly projecting equalizing arms 53 and connecting these equalizing arms by longitudinal equalizing rods or links 54, as shown in Figs. 1 and 2. It follows from this construction that if either one of the tension shafts is turned more or less by a relative displacement of one of the wheel rings and the associated supporting bracket that this movement will be transmitted not only to the companion wheel but also to the wheels of the other pair of wheels so as to bring the resilient elements associated therewith into action.

In order to utilize the resilience of the main springs 5, 6 which connect the frame with the axle as additional means for cushioning the load and shock which may be imposed upon the vehicle and its wheel, means are provided for coupling these springs with the other springs which are primarily intended for cushioning purposes. The manner of accomplishing this purpose consists in connecting the main frame with the tension arms 50 by means of links 55, as shown in Figs. 1, 2 and 4. By this means the turning motion of the tension shafts operates upon the main frame so that the main springs 5, 6 add their resilience to the remaining springs, thereby utilizing a much larger amount of the available spring capacity of the vehicle for cushioning the wheels. By thus distributing the load over the entire spring system of the vehicle a much greater cushioning support for the load on the vehicle is provided so that the latter is relieved from undue jar and wear, as well as saving the load from harm and insuring greater comfort to the passengers.

Various means may be provided for driving this vehicle by means of power and in the present construction these means are so organized that both the front steering wheels and the rear nonsteering wheels are driven. In the particular embodiment of this feature, as best shown in Figs. 1–6, a transverse driving shaft is arranged in each one of the hollow tension shafts, each of these driving shafts comprising a central section 56 which is journaled in suitable bearings within the central section of the companion tension shaft and outer end sections 57 journaled in suitable bearings in the outer end sections of the companion hollow tension shaft and each outer driving shaft section being connected by means of a universal joint 58 with the respective inner driving shaft section, each of these universal joints being arranged in line with the pivotal connections between the adjacent outer and central tension shaft sections and the pivotal connection between the supporting bracket and the respective outer axle arm so that the sections of the driving shaft may be turned freely and still permit the steering wheels to turn in a horizontal direction. Motion may be transmitted from each of the outer driving shaft sections to the wheel ring or rim in any suitable manner, for instance, by means of a driving gear wheel 59 secured to the respective outer driving shaft section, a driven gear wheel 60 turning concentrically with the bearing roller 10 on the pivot 11 and meshing with the gear rack 80 and two intermediate gear wheels 61, 62, which are pivoted on the supporting bracket and mesh with each other on their opposing sides while their opposite sides mesh respectively with the driving gear wheel 59 and the driven gear wheel 60, as shown in Figs. 2, 3 and 4. By engaging the driven gear wheel with the wheel ring adjacent to the bearing roller 10 the wheel ring is free to shift its position with reference to this bearing roller and driven gear wheel in response to the resilient action of the wheel without disturbing the driving connection between this wheel ring and the driving shaft.

In the case of a wheel which is not employed for steering the vehicle, the tension shaft may be formed so that it is practically one piece, as shown at 63 in Fig. 8, instead of being articulated and the driving shaft may also be formed in one piece, as shown at 64 in said Fig. When this driving shaft is in one piece the driving gear wheel 65 may be directly secured thereto, as shown in Fig. 8 while the remaining gearing for transmitting movement from the same to the wheel ring may be constructed similar to that shown in Figs. 3 and 4.

If it is not desired to drive the wheel ring but to propel the vehicle by other means, the driving shaft and the gearing or equivalent means for transmitting motion from this shaft to the wheel ring may be omitted in which case only the resilient means for cushioning purposes are utilized.

The driving shafts may be operated in any suitable manner, for instance, as shown in Fig. 1, by a motor 66 mounted on the main frame and having a longitudinal shaft 67ª which is connected by bevel gear wheels 67, 67 with the central sections of the driving shafts.

Although this resilient mechanism has been shown embodied in a motor vehicle it is to be understood that the same is equally applicable to other types of vehicles which are not power operated and the same may also be used in the landing carriages or skids of aeroplanes in which similar cushioning effects are desirable when the aeroplane is making a starting or landing.

I claim as my invention:

1. In a wheeled vehicle, the combination of a rotatable supporting ring, a supporting member having a part normally engaging with said ring on one side of a vertical line drawn through the axis of the same, and resilient means arranged and operating to resist the movement of said member and ring relatively to one another in a direction in which the point of engagement between said ring and member tend to approach said vertical line.

2. In a wheeled vehicle, the combination of a rotatable supporting ring, a supporting member arranged adjacent to the space within said ring and having a part normally engaging with said ring on one side of the vertical center line of the same, and resilient means arranged and operating to resist the movement of said member and ring relatively to one another in a direction in which the point of engagement between said ring and member tend to approach said line comprising a rocking member pivoted on said supporting member and having a part normally engaging with said ring on its opposite side, and means which resist the movement of said rocking member in a direction in which its point of contact with said ring approaches the point of engagement between said ring and said supporting member.

3. In a wheeled vehicle, the combination of a rotatable supporting ring, a supporting bracket arranged adjacent to the space within said ring and having a part normally engaging with said ring on one side of a vertical line drawn through the axis of the same, and resilient means arranged and operating to resist the movement of said bracket and ring relatively to one another in a direction in which the point of engagement between said ring and bracket tend to approach said vertical line comprising a rocking member pivoted on said bracket, a guide member connected with said rocking member, rollers mounted on said guide member and engaging with the bore of said ring, and resilient elements which resist the turning of said rocking member.

4. In a wheeled vehicle, the combination of a rotatable supporting ring, a supporting bracket arranged adjacent to the space within said ring and having a part normally engaging with said ring on one side of a vertical line drawn through the axis of the same, and resilient means arranged and operating to resist the movement of said bracket and ring relatively to one another in a direction in which the point of engagement between said ring and bracket tend to approach said vertical line, which resilient means include yielding elements arranged outside of said supporting ring.

5. In a wheeled vehicle, the combination of a main frame, a wheel member, a load carrying axis movable relative thereto and means which resist displacement of said member out of its normal position relatively to said load carrying axis and which comprises a yielding element mounted on the frame and operatively associated with said member.

6. In a wheeled vehicle, the combination of a main frame, an axle, a spring connecting the frame and axle, a wheel member, movable relative to said axle and means operatively connecting said wheel member and frame for causing said spring to resist relative displacement of said frame and wheel member out of their normal position relatively to said axle.

7. In a wheeled vehicle, the combination of a frame, front and rear axles, springs connecting said axles with said frame, front and rear wheel members comprising rotatable supporting elements which are associated with said axles, and movable relative thereto and means operatively connecting said wheel elements with said frame and with each other and cause the same to be shifted uniformly into and out of their normal position relatively to said axle.

8. In a vehicle, the combination of front and rear axles, a frame to which said axles are connected, front and rear wheel elements associated with said axles, and movable relative thereto spring elements which yieldingly retain said wheel elements in their normal position relatively to said axles, and means for causing all of said spring elements to be flexed simultaneously.

9. In a wheeled vehicle, the combination of a rotatable supporting ring, a supporting member arranged adjacent to the space within said ring and having a part movably engaging with said ring on one side of a vertical line drawn through the axis of the same, a yieldable member movably engaging with said ring on the other side of said vertical line and means which yieldingly resist the movement of the centers of bearing of said engaging members towards each other.

10. In a wheeled vehicle, the combination of a rotatable supporting wheel, a supporting bracket arranged adjacent said wheel and having an axis carried by said wheel on one side of a vertical line drawn through the center of said wheel, resilient means arranged and operating to resist the movement of said axis and wheel relatively to one another in a direction in which the said axis tends to approach said vertical line comprising a rocking member pivoted in fixed relation with said bracket and so arranged as to be swung on its pivot when the relative positions of said wheel and axis are changed, a cam arranged on said rocking member, a rock arm pivotally supported in fixed relation to said axis and adapted to be shifted by said cam, and a resilient element which resists the movement of said rock arm under the action of said cam.

11. In a wheeled vehicle, the combination of a rotatable supporting wheel, a supporting bracket arranged adjacent to said wheel and having a load axis carried by said wheel on one side of a vertical line drawn through the center of said wheel, and resilient means arranged and operating to resist the movement of said axis and wheel relative to one another comprising a frame, a rock shaft, means for transmitting motion from said wheel to said rock shaft, and a resilient element to yieldingly resist such movement.

12. In a wheeled vehicle, the combination of a rotatable supporting wheel, a supporting bracket arranged adjacent said wheel and having an axis supported by said wheel normally on one side of a vertical line drawn through the center of the same, and resilient means arranged and operating to resist the movement of said axis and wheel relatively to one another comprising a rocking member pivoted in fixed relation to said axis and so positioned as to be swung on its pivot by a movement of said wheel about said axis, and means operating to yieldingly resist movement of said rocking member comprising a cam arranged on said rocking member, a rock shaft journaled on said bracket, a rock arm connected with said rock shaft and engaging with said cam, and a spring which operates to resist the turning movement of said rock shaft.

13. In a wheeled vehicle, the combination of a rotatable supporting wheel, a supporting bracket arranged adjacent said wheel and having an axis carried by said wheel on one side of a vertical line drawn through the center of said wheel, resilient means arranged and operating to resist the movement of said axis and wheel relatively to one another in the direction in which said axis tends to approach said vertical line comprising a rocking member pivoted in fixed relation to said axis and so arranged as to be swung on its pivot whenever said axis approaches said vertical line, an axle on which said bracket is mounted, a rock shaft connected with said rocking member, a frame, a spring connecting said frame and axle, and means movably connecting said rock shaft and frame comprising a coupling arm arranged on said shaft, and means for connecting said coupling arm and frame.

14. In a wheeled vehicle, the combination of an axle, an axle arm mounted on said axle, a wheel, a load axis on said axle arm and carried by said wheel on one side of the vertical center of the same, means for yieldingly retaining said wheel and load axis in a normal position relatively to each other, and means for adjusting said axle arm relatively to said axle.

15. In a wheeled vehicle, the combination of a wheel, a bracket having a load carrying axis carried by said wheel on one side of the vertical center of the same, means for yieldingly retaining said wheel and axis in a normal position relatively to each other, and means for driving said wheel, including a driven member in rolling engagement with said wheel.

16. In a wheeled vehicle, the combination of a wheel, a bracket having a load carrying axis carried by said wheel on one side of the vertical center of the same, means for yieldingly retaining said wheel and axis in a normal position relatively to each other, means for driving said wheel comprising a driving element mounted on said bracket, and means for transmitting motion from said driving element to said wheel.

17. In a wheeled vehicle, the combination of a wheel, a bracket adjacent said wheel having a load carrying axis carried by said wheel on one side of the vertical center of the same, means for yieldingly retaining said wheel and axis in a normal position relatively to each other, means for driving said wheel comprising a driving gear, a gear rim arranged on said wheel, a driven gear wheel mounted on said bracket and meshing with said gear rim, intermediate gearing mounted on said bracket and meshing with said driving and driven gear wheels, a support on which said bracket is pivoted, and a driving shaft composed of sections, said sections being connected by a universal joint arranged in line with the pivotal connection between said bracket and support and one of said driving shaft sections being connected with said driving gear wheel.

18. In a wheeled vehicle, the combination of a wheel, a bracket having a load carrying axis carried by said wheel on one side of the vertical center of the same, means for yieldingly retaining said wheel and axis in a normal position relatively to each other, a support on which said bracket is pivoted, and means for driving said wheel comprising a sectional shaft one section of which is mounted on said bracket and two sections of which are connected with a universal joint which is arranged in line with the pivotal connection between said bracket and support.

19. In a vehicle, a rotatable supporting wheel, and a supporting member having a load bearing axis supported by said wheel, said axis being located to the rear of the vertical center of said wheel and below the longitudinal center thereof so as to throw said wheel rearwardly relatively to the vehicle frame under the influence of shock whereby the force of impact at the periphery of the wheel is reduced.

20. In a vehicle, a rotatable supporting wheel, a supporting member having a load bearing axis supported by said wheel, the point of support being removed from the center of said wheel, the weight of said supporting member having a tendency to bring the center of said wheel in vertical alignment with the point of support, the arrangement being such that the point of support is maintained at all times the same distance from the axis of said wheel, and resilient means for resisting such movement, including resilient elements having a connection with the vehicle frame outside of said wheel.

21. In a wheeled vehicle, a rotatable supporting wheel, a supporting member supported by said wheel on one side of a vertical line drawn through the axis of the same, and resilient means supported by said wheel on the opposite side of said vertical line and movable toward said supporting member to resist the movement of said member and wheel relatively to one another in a direction in which the point of engagement between said wheel and member tend to approach said vertical line.

22. In a wheeled vehicle, a plurality of wheels, a plurality of axes carried eccentrically by said wheels and movable relatively thereto, and a resilient element so placed as to be energized when any one of said wheels is moved upward in relation to its eccentric axes.

23. In a wheeled vehicle, a vehicle frame, a wheel, an axis eccentric therewith and normally positioned at one side of the vertical center line thereof, and resilient elements between said frame and axis constructed and arranged to yieldingly oppose the swinging of said wheel about said axis, from the normal position of said wheel, in the direction in which the vertical center line of said wheel will approach said axis, under load or shock.

24. In a wheeled vehicle, the combination of a frame, a wheel on each side thereof, axes supporting said frame carried eccentrically by said wheels, resilient means common to all of said axes, tending to hold any or all of the same out of the vertical center line or lines of said wheel or wheels, and means for causing said wheels and said axes to change their relative positions uniformly.

25. In a wheeled vehicle, the combination of a rotating wheel, a load carrying axis supported by said wheel on one side of its vertical center line, resilient means to tend to maintain said wheel and axis in their normal relative positions, and a cam for modifying the flexing of said resilient element.

26. In a wheeled vehicle, the combination of a rotatable supporting wheel, a supporting axis carried by said wheel on one side of its vertical center line, and a swinging member pivoted in fixed relation to said axis and so arranged as to be caused to turn on its pivotal point whenever the positions of said wheel and said axis are relatively changed and means to yieldingly resist the turning of said swinging member upon its pivot.

27. In a wheel, a load carrying axis positioned on one side of the vertical center line of said wheel, yieldable devices for supporting said axis comprising a swinging part and a resilient element operatively associated therewith, the construction and arrangement being such that said swinging part is yieldably carried in relation to said wheel.

28. In a vehicle, a wheel, a load bearing axis yieldably positioned in relation thereto rearwardly of the vertical center line of said wheel, resilient means to tend to maintain said vertical center line forward of said axis, and means for imparting rotary motion to said wheel from said axis.

29. In a vehicle, a wheel, a load carrying axis yieldably positioned in eccentric relation thereto, resilient means to tend to maintain said wheel and axis in their normal relative positions, the construction and arrangement being such that every relatively downward force on said axis tends to move said wheel rearwardly of said vehicle, thereby reducing the impact at the wheel's periphery when obstructions are encountered.

JAMES L. GARVER.